US010657590B2

(12) United States Patent
Rose et al.

(10) Patent No.: US 10,657,590 B2
(45) Date of Patent: May 19, 2020

(54) SYSTEM AND METHOD FOR AN ELECTRONIC LENDING SYSTEM

(71) Applicant: Branch Banking and Trust Company, Raleigh, NC (US)

(72) Inventors: Teresa Rose, Holly Springs, NC (US); Patricia Kinney, Cary, NC (US); Barbara Whorf, Raleigh, NC (US); Paal Kaperdal, Raleigh, NC (US); Douglas Joel Zickafoose, Raleigh, NC (US)

(73) Assignee: Branch Banking and Trust Company, Raleigh, NC (US)

( * ) Notice: Subject to any disclaimer, the term of this patent is extended or adjusted under 35 U.S.C. 154(b) by 768 days.

(21) Appl. No.: 14/993,963

(22) Filed: Jan. 12, 2016

(65) Prior Publication Data

US 2016/0125531 A1 May 5, 2016

Related U.S. Application Data

(63) Continuation of application No. 12/540,153, filed on Aug. 12, 2009, now abandoned.
(Continued)

(51) Int. Cl.
| | |
|---|---|
| *G06F 17/00* | (2019.01) |
| *G06Q 40/00* | (2012.01) |
| *G06Q 40/02* | (2012.01) |
| *G06Q 20/10* | (2012.01) |
| *G06Q 20/26* | (2012.01) |

(52) U.S. Cl.
CPC .......... *G06Q 40/025* (2013.01); *G06Q 20/108* (2013.01); *G06Q 20/1085* (2013.01); *G06Q 20/26* (2013.01); *G06Q 40/00* (2013.01); *G06Q 40/02* (2013.01); *G06Q 40/12* (2013.12)

(58) Field of Classification Search
CPC .......... G06Q 20/10; G06Q 40/02; G06Q 30/02
See application file for complete search history.

(56) References Cited

U.S. PATENT DOCUMENTS

| | | | |
|---|---|---|---|
| 6,567,805 B1 * | 5/2003 | Johnson | G06F 16/30 707/740 |
| 2001/0037288 A1 * | 11/2001 | Bennett | G06Q 30/0601 705/38 |

(Continued)

*Primary Examiner* — Talia F Crawley
(74) *Attorney, Agent, or Firm* — Duane Morris LLP (57) ABSTRACT

A method for interfacing with a financial institution using a computer interface is disclosed for on-line or E-Lending. A customer selects a lending product on the website of a financial institution. The financial institution receives information to authenticate the customer, and receives additional information related to the financial history and lending needs from the customer. The terms and conditions related to the lending product are presented to the customer and an authorization to an application is received from the customer. A risk analysis is performed using information received from the customer and the application of the loan is subject to approval based at least in part on the risk analysis. The third set of information related to insurance, disclosures, etc is received from the customer and a fourth set of information related to the closing information is provided back to the customer. The loan may be further closed on-line or with an attorney or agent.

10 Claims, 7 Drawing Sheets

Related U.S. Application Data (60) Provisional application No. 61/088,267, filed on Aug. 12, 2008, provisional application No. 61/088,229, filed on Aug. 12, 2008, provisional application No. 61/088,239, filed on Aug. 12, 2008.

(56) References Cited

U.S. PATENT DOCUMENTS

| | | | |
|---|---|---|---|
| 2001/0039516 A1* | 11/2001 | Bennett | G06Q 20/20 705/26.8 |
| 2002/0073023 A1* | 6/2002 | Castro | G06Q 30/02 705/38 |
| 2004/0111370 A1* | 6/2004 | Saylors | G06Q 20/10 705/40 |
| 2005/0289046 A1* | 12/2005 | Conyack, Jr. | G06Q 40/02 705/38 |
| 2006/0004651 A1* | 1/2006 | Corr | G06Q 40/02 705/38 |
| 2008/0091530 A1* | 4/2008 | Egnatios | G06Q 20/10 705/14.25 |
| 2009/0276368 A1 | 11/2009 | Martin et al. | |
| 2010/0030687 A1* | 2/2010 | Panthaki | G06Q 20/108 705/43 |
| 2011/0112946 A1* | 5/2011 | Porter | G06F 40/117 705/35 |

\* cited by examiner

SYSTEM AND METHOD FOR AN ELECTRONIC LENDING SYSTEM

RELATED AND CO-PENDING APPLICATIONS

This application is a continuation of and claims priority to U.S. application Ser. No. 12/540,153 entitled "System and Method for On-Line Lending", filed on 12 Aug. 2009, which is a non-provisional of and claims priority benefit of provisional applications: "System and Method for Business On-line Account Opening", Ser. No. 61/088,267 filed 12 Aug. 2008; "System and Method for Retail On-line Account", Ser. No. 61/088,229 filed 12 Aug. 2008; and "System and Method for an Electronic Lending System", Ser. No. 61/088,239 filed 12 Aug. 2008. Additionally, this application hereby incorporates by reference, in their entirety, each of the following applications: "System and Method for Retail On-line Account Opening", Ser. No. 14/807,219 filed on 23 Jul. 2015 which is a continuation of "System and Method for Retail On-line Account Opening" application Ser. No. 12/540,179, filed 12 Aug. 2009, now abandoned; and "System and Method for Business On-line Account Opening", Ser. No. 12/540,188 now U.S. Pat. No. 8,612,188, filed 12 Aug. 2009.

BACKGROUND

Increasingly, the public is going on-line for a variety of transactions and information. More than 30% of the population has personal computers and modems. Furthermore, over 60% of people with bank accounts have personal computers and modems. At the same time the number of people subscribing and using on-line services is greater than 40 million, and this number is growing at an exponential rate.

As the public uses computers with a greater frequency, more financial transactions are being automated and performed via computer. There is good motivation to bank on-line. On-line banking provides convenience, safety, cost savings, and potentially new types of services not readily or conveniently available via in-person banking. Such potentially new services include access to superior up-to-the minute information, on-line investment clubs, information filters, and search agents.

With the increase in the number of financial transactions performed on-line, the convenience and cost-savings of banking on-line also increases. Additionally, new and more powerful methods are being developed for protecting the security of financial transactions performed on-line. The result is that convenience, cost savings and enhanced security have combined to make on-line financial services more useful and effective, thereby driving the development of newer and more integrated services. More sophisticated financial systems that offer greater integration and a high degree of user control enable on-line users to synthesize, monitor, and analyze a wide array of financial transactions and personal financial data.

Currently, methods exist for users to perform a variety of on-line financial transactions. These methods however fail to offer on-line lending including qualification verifications. For example, users may bank on-line, thereby enabling performance of transactions, such as transfers from one account to another, but must already have an established account or line of credit in the financial institution.

In view of the increase of electronic commerce in the market place the present subject matter discloses a unique on-line account opening method. The disclosed subject matter enables a stream-lined entry to an on-line lending presence.

A method is needed in which customers may apply for a loan on-line and be enrolled in financial offerings as a result of qualification and verification of the qualification based on a set of criteria.

In order to obviate the deficiencies of the prior art, the present disclosure presents a novel method for interfacing with a financial institution using a computer interface. In the method, a customer's request is received from a customer that has reached a predetermined webpage of the financial institution using a computer network. A first content is presented to the customer, and a first input is received from the customer. A customer is authenticated if the customer is determined to be an existing on-line banking customer. A first set of information is received from the customer and presented back to the customer for review.

In the method, a second set of information is further received from the customer. The terms and conditions are presented to the customer. An authorization to proceed with a credit check and an application are received from the customer. A risk analysis is performed using information received from the customer and the application of the loan is subject to approval based at least in part on the risk analysis. The third set of information is received from the customer and a fourth set of information is provided back to the customer. The fourth set of information related to the costs and schedule associated with the line of credit or loan product.

Another method is also presented for interfacing with a financial institution using a computer interface. The method includes receiving a product selection from the customer along with a first set of identification information. The method further includes a review the first set of information and a determination of the identity of the customer from the first set of information. If the customer identification cannot be made the process terminates.

A determination is made whether the customer is an existing on-line client of the financial institution and, if so, fields of the application for the selected product based on information known from the preexisting relationship are pre-populated. A third set of information is received from the customer that includes information relating to collateral, customer income, customer asset, customer liability, and combinations thereof.

The method determines an amount of the line of credit or the amount and term of loan product. Additional disclosures and an application are received from the customer for the chosen product or products.

These and many other objects and advantages of the present invention will be readily apparent to one skilled in the art to which the invention pertains from a perusal of the claims, the appended drawings, and the following detailed description of the preferred embodiments.

DETAILED DESCRIPTION

Figure 1:
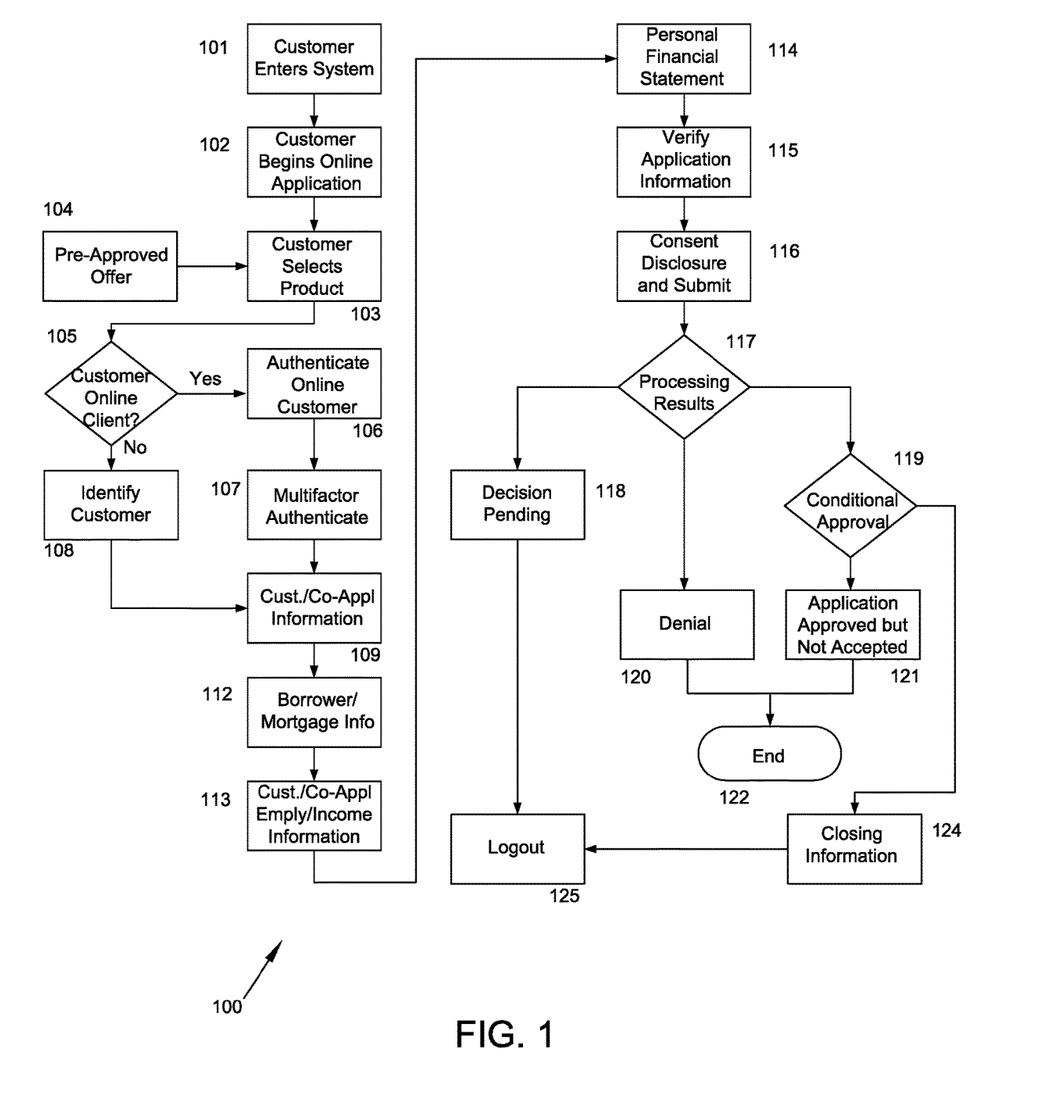
FIG. 1 is a flow chart of an embodiment of the disclosed subject matter.

FIG. 1 illustrates a process in which a customer may apply for a loan on-line via a computer network, e.g., the Internet, by accessing and exchanging information using the website of a financial institution. The customer enters the system by accessing or being directed to the institutions' website (webpage) as shown in Block 101. In either event, a request for the website is received by the financial institution's server or proxy server. The customer is presented a list of products such as a checking account, savings account, an on-line only savings account or brokerage account or any of a number of financial products offered by the institution. These financial products may also include a deposit account, which may be in the form of a certificate of deposit, individual retirement account, retirement account, a 401(k) account, tax-deferred college savings account or combination thereof. In particular, for the present disclosure, loan and credit line products are presented to the customer. The loan and credit line products may include home loans, home equity loans, auto loans, secured loans, line of credit and unsecured loans. The selection of products presented to the customer may also be a function of path used by the customer to arrive at the website. For example, if the customer accessed the website via a hyperlink on another site directed to automobiles, only the automobile loans or secured loan products may be presented, or the entire scope of products is presented but only the automotive loan products may be highlighted. In this manner, the most relevant products based on the customer's path may be brought to the customer's attention. As part of the selection process, an on-line loan application is undertaken as shown in Block 102. Information obtained during the process may be automatically input into the application. The customer may also be provided with a set of terms and conditions which may govern the use of the website, on-line banking, application process, liabilities, etc. The terms and conditions may also include a customer check-off which may be required to continue and ensure they have been at least noticed, if not reviewed by the customer.

Following FIG. 1, the customer may then select a loan or line of credit product (lending product encompasses both terms hereinafter) from the products presented as shown in Block 103. The group or set of lending products may include pre-approved offers as shown in Block 104, which may also be a function of the path of access to the financial institutions website or other information associated with the customer. A determination is made in decision Block 105 of whether the customer is an existing on-line client of the financial institution. If the customer is a pre-existing on-line client, the customer is authenticated as shown in Block 106. The authentication process may match known information with information provided by the customer. In addition, known information based on the pre-existing relationship may be pre-populated in the on-line application for the convenience of the customer. Multifactor authentication may also be performed as shown in Block 107 and authentication process is described in greater detail with respect to FIG. 6. A first set of information regarding the customer and/or co-applicant is requested of and received from the customer as shown in Block 109. The information may include the name, his/her physical address, date of birth, SSN or part thereof (e.g. last four digits), contact information such as phone numbers and email addresses, citizenship, and information regarding the characteristics of the identification (e.g. type, ID Number, State of issuance, issue date and expiration date), user name, password or other identifying indicia/code that enables the identification of the customer or links the customer to the customer's established account(s) as well as information regarding a co-applicant if any. If the customer is not a current on-line client of the financial institution, the customer is identified as shown in Block 108, a process of identifying the customer is described in greater detail with respect to FIG. 7.

The first set of information may be verified. This verification may include presenting back to the customer the first set of information and accepts corrections to the first set of information the customer has made. The website may allow and request the customer to annotate, modify or otherwise change incorrect or incomplete information upon its presentation to the customer.

A second set of information is also requested and received from the customer as shown in Blocks 112, 113 and 114. This information may include borrower and mortgage information, employment and income information, as well as personal financial statements. This second set of information may include employment history, income, assets, liability, loan amount, securitization, collateral valuation, purchase amount, location of property, etc.

The information received from the customer pertinent to the lending product may be verified as shown in Block 115 and a consent disclosure is solicited and received from the customer as shown in Block 116. The consent disclosure may include consent to a credit check and gathering other personal or financial information.

As part of the processing of the application for the selected lending product, a risk assessment/analysis is performed using information contained in the application as well as information known from internal and external sources as shown in Block 117. The risk analysis is performed on the customer to determine if the customer's activities present an unacceptable or acceptable risk. If the risk analysis yields an unfavorable result indicating the customer is high risk, the loan may not be approved on-line. In such a case the customer may be required to appear in person to facilitate the lending product.

As a result of processing the information the customer's application is conditionally approved, denied, or placed in pending status. If the decision is pending as shown in Block 118, further on-line processing ends and off-line processing may commence. If as a result of the processing, a denial is issued as shown in Block 120, the customer is informed and the processing of the application for the selected product terminates as shown in Block 122. If the application is conditionally approved as shown in Block 119, the terms and conditions for the lending product are presented to the customer. The terms and conditions may include an electronic disclosure, a retail bank services agreement, a pricing guide, a corporate privacy notice, and a tax identification number certification as well as others common to the industry. If the customer does not accept the lending offer as shown in Block 121, the application process terminates as shown in Block 122. If the customer accepts the offer, additional information is required from the customer. This additional information may include insurance information including homeowners, hazard insurance, flood insurance, auto insurance etc. and may include information on desired closing agent or attorney and title company.

Closing information is then presented to the customer as shown in Block 124. The closing information may include Real Estate Settlement Procedures Act (RESPA) information, a good faith estimate of the settlement costs, home loan amortization schedule, client identification profile, servicing disclosures, and line of credit information, home equity line of credit information, home loan information, automobile loan, boat loan and other loan information.

Along with the closing information, the customer may be presented a summary of the lending product selected by the customer and other information such as the nearest branch location and other information a borrower may find useful. Contact information including phone number, addresses, email addresses and web pages may be presented to the customer during this presentation.

Additional products and offers may also be communicated to the customer subsequent to the closing information, these products and offers may be only tangentially related or provided by third parties, these advertisements may also be presented based on the information collected during the on-line process and may be selected by the financial institution. Selection by the financial institution prevents the unwanted disclosure of private information but still allows the advertizing to be marketed based on financial status. For this additional product offering, the customer may be connected to another site. The customer may then logout of the application process as shown in Block 125.

Figure 2:
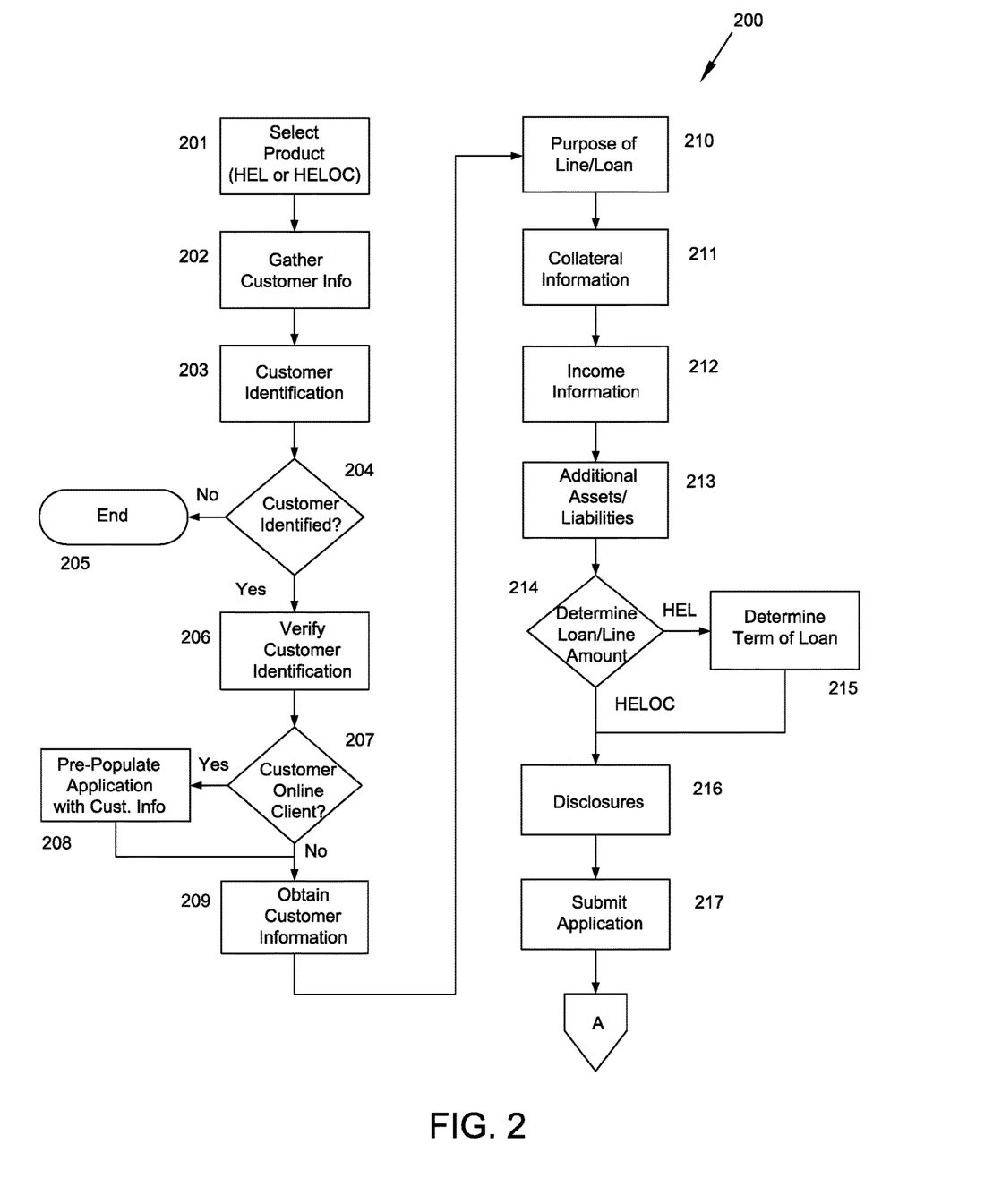
FIG. 2 is a flow chart of another embodiment of the disclosed subject matter.

A flow chart 200 is shown in FIG. 2. The flow chart illustrates an additional method for interfacing with a financial institution using a computer interface. The customer enters the system. The products offered on the website may also include more or less detailed descriptions as well as the cost, rates and duration periods. This information may be on the introduction page or accessible from a selectable pop up window or hyperlink. The customer's product selection is made and received by the financial institution or server as shown in Block 201.

In FIG. 2, following receipt of the customer's product selection, a first set of information is collected from the customer as shown in Block 202 and the customer's identity is determined based on the first information as shown in Block 203. If the customer successfully passes the identification authentication, as shown in decision Block 204, the process continues otherwise, either an exception is granted or the application process terminates as shown in Block 205. If the customer is an existing client an exception process may be entered where the customer's application may be placed in a pending status, where continuation of the application is subject to a review process. This additional review process may advantageously include review of the past and current relationship between the financial institution and the customer, as well as other considerations related to the customer's client status. The customer's identification is verified as shown in block 206. The verification may be a presentation back to the customer.

A determination is made in decision Block 207 if the customer is an existing client of the financial institution. If the customer is an existing client, information known to the institution as a result of this relationship is used to pre-populate the relevant application fields for the convenience of the customer as shown in Block 208. In addition to populating fields, portions of the application may be truncated (removed) to make for a shorter application process.

Also, if the customer is an existing client, an exception may be granted, where otherwise the process would be terminated (e.g. Block 205). Customers granted an exception and placed in pending status may be manually reviewed by the financial institution, however information and product presentation may continue until the review is completed.

A second set of information may then be requested and received from the customer as shown in Blocks 209-213. This information may include additional customer information, employment history, information regarding the purpose of the lending product, collateral information, customer income information, customer asset information, customer liability information, etc. and combinations thereof.

From this information along with internal financial institution guidelines the loan or credit line amount, if any, may be determined as shown in Block 214. For a loan, the term of the loan may then be established as shown in Block 254. The term may be based on not only the loan amount but also on interest rate, monthly payments or lifetime of the collateral. Disclosures are received from the customer as shown in Block 216 and the application is submitted by the customer to the financial institution as shown in Block 217. The disclosure may also include a consent to obtain financial information, such as a credit history or score, from a third party.

Figure 3:
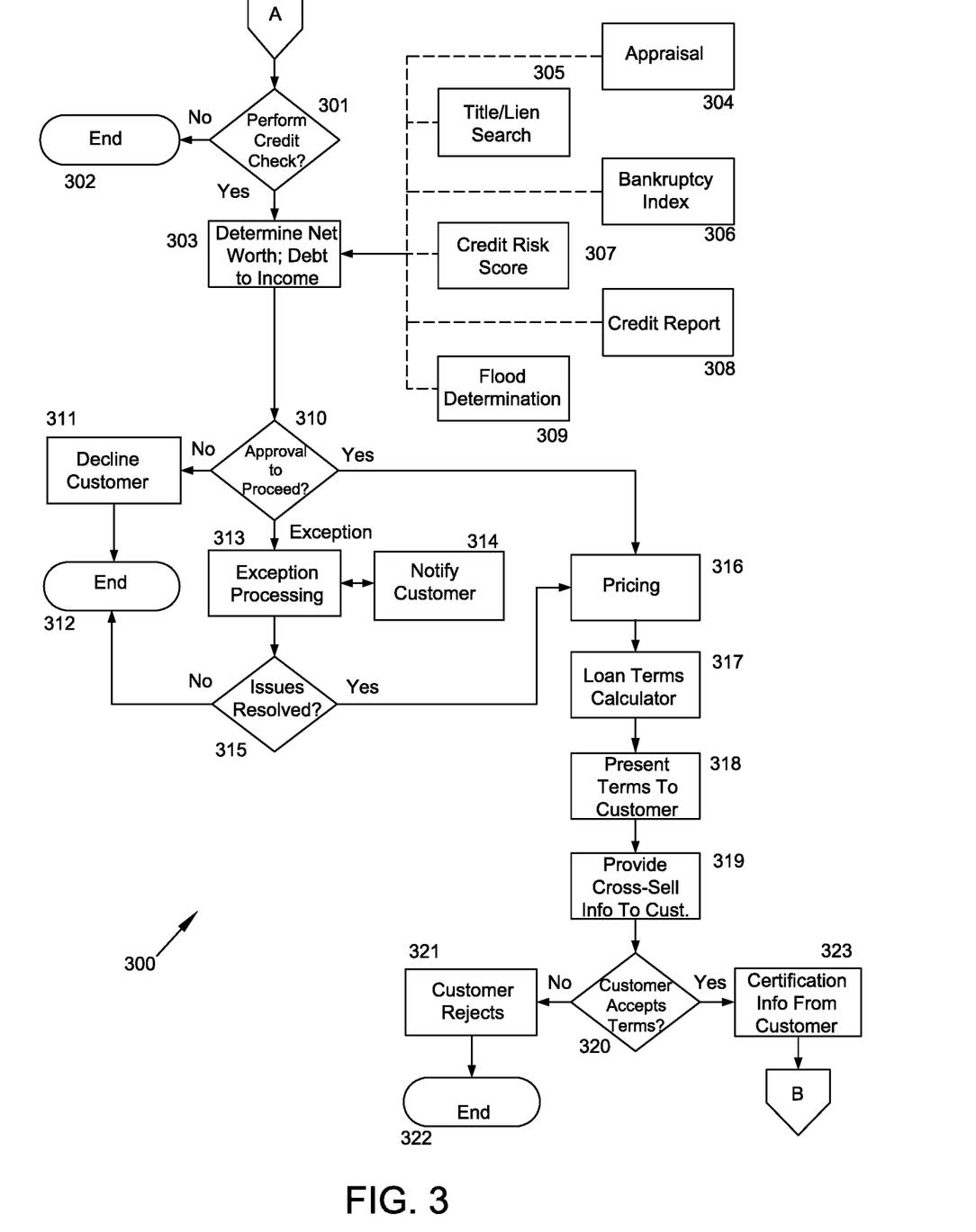
FIG. 3 is a flow chart representing loan or credit line approval according an embodiment of the disclosed subject matter.

FIG. 3 illustrates additional processes that may be performed by the financial institution in conjunction with the method shown in FIG. 2. These steps are typically considered back room operations that are transparent to the customer. A credit check is performed as shown in Block 301, if because of inaccurate information, or a lack of permission the process may be terminated as shown in Block 302. Alternatively, the customer may be requested to send additional information and/or a grant of permission. In addition to performing a credit check, information gained during the application process is used to obtain information public and private relating to the customers application. This information may be held internally or available from third parties. This information may include title and lien searches on the collateral property if any as well as claimed and unclaimed assets, information regarding the customer's bankruptcy history if any as well as liabilities, a credit score and history to reflect current and past loans, a determination if the property is in a flood zone and other information regarding valuations, appraisals and ability to repay the loan or line of credit as shown in Blocks 304-309.

In addition, a fraud analysis may be performed on the customer, this analysis may include determining if the customer is listed as a fraudster on an internal or external database. The fraud analysis may also include evaluation of the customer's provided information, such as whether the SSN is associated with a person who is deceased, or if the SSN was issued prior to the customer's reported birth date, other checks such as determining if the mailing address is associated with a prison or other notorious entity would also be advantageous. If the fraud analysis presents red flags or warnings the loan approval process may terminate or be prevented from being applied for on-line as discussed above.

This information combined with information supplied by the customers may then be used to determine a net worth of the customer and/or a debt to income ratio for the customer as shown in Block 303. A determination to proceed with the processing of the application is made is Block 310. This determination may be based on information gathered, credit scores or other financial characteristics of the customer or the collateral. If the financial institution does not gain approval to proceed, as a result of a customer not qualifying, the application is declined as shown in Block 311 and the process terminates as shown in Block 312. If there are outstanding issues that need to be addressed before the application processing continues an exception may be made as shown in Block 313. The customer is notified of outstanding issues that have stayed the processing of the application as shown in Block 314. If the issues are subsequently resolved by the customer and or financial institution as shown in decision Block 315, the application approval process continues, otherwise where the issues have not been resolved the application process is terminated as shown in Block 312.

Upon approval of the application, the pricing information for the lending product may be determined as shown in Block 316 and the loan term may be calculated in Block 317. The closing terms and conditions for the lending product are presented to the customer as shown in Block 318. The customer, upon receiving a presentation of the terms and conditions which may include pricing and other cost information makes a determination on whether to accept or reject the lending product in decision Block 320. Prior to the decision, the customer may also be presented with information regarding other products offered by the financial institution or business partners as shown in cross-selling information Block 319. If the terms and conditions of the lending product are rejected as shown in Block 321, the process terminates as shown in Block 322. If the customer accepts the terms and conditions, certification information is received from the customer as shown in Block 323. The certification information may include information regarding insurance, title and collateral. A list of other financial institution products may also be presented to the customer after the completion of the approval of the lending product. In addition, targeted advertisements from third parties may be presented to the customer.

Figure 4:
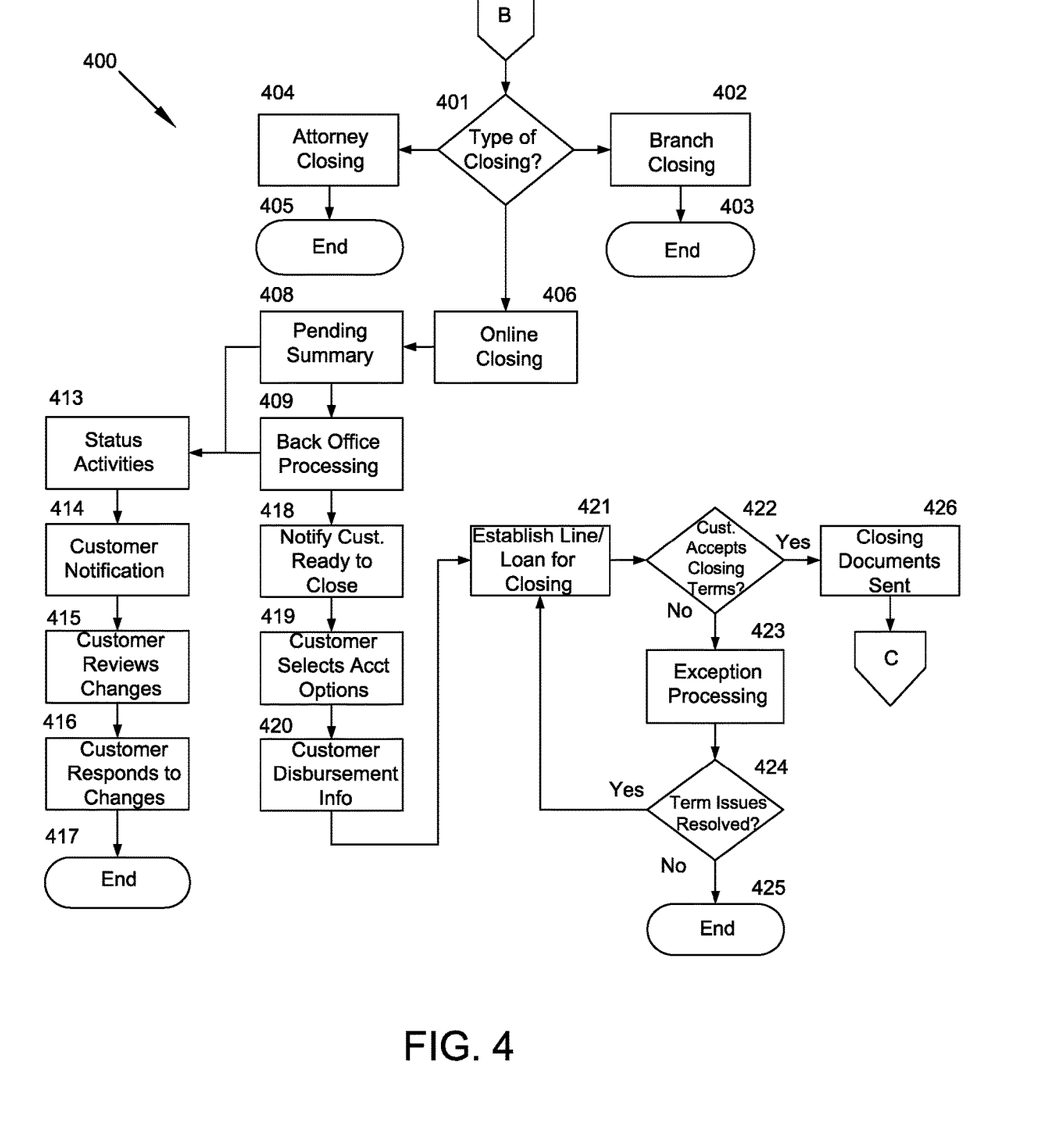
FIG. 4 is a flow chart representing closing processes according to an embodiment of the disclosed subject matter.

FIG. 4 illustrates processes required in closing a lending product. In Block 401 a type of closing is selected by the customer. If the closing is to be completed at a branch location as shown in Block 402, the on-line processing of the lending product terminates as shown in Block 403. Similarly, if the type of closing selected is that of an attorney closing as shown in Block 404, the on-line processing terminates in Block 405. Information gathered during the on-line phase of the application may still be used in the closing, but active on-line processing is no longer required in these situations. If the customer selects on-line closing as shown in Block 406, a pending summary of the lending product and application is presented to the customer in Block 408. The pending summary highlights the pertinent features, terms and conditions of the lending product for the customer's final review. Back office or back room processing is done by the financial institution or agency thereof as shown in Block 409. This back room processing typically includes pre-closing functions, final underwriting and document preparation. If a change in status of the lending product occurs as shown in Block 413, the customer is notified as shown in Block 414, the customer reviews the changes and responds to the changes in Blocks 415 and 416, respectively. If a change is not accepted or approved by the customer the process terminates as shown in Block 417, otherwise the customer is notified that the lending product is ready for closing as shown in Block 418.

Account options selected by the customer are received as well as customer disbursement information in Blocks 419 and 420 respectively. The closing terms are established for the lending product in Block 421 and are presented to the customer. In decision Block 422, the customer's decision on acceptance of the closings terms is made. If the closing terms are accepted, the closing documents may be sent to the customer as shown in Block 426. These documents may be sent electronically or in hardcopy form (paper). If the terms are not accepted, exception processing may be entered as shown in Block 424. If closing term issues are resolved, the closing terms are again compiled and presented to the customer as shown in Block 421 otherwise the process terminates in Block 425.

Figure 5:
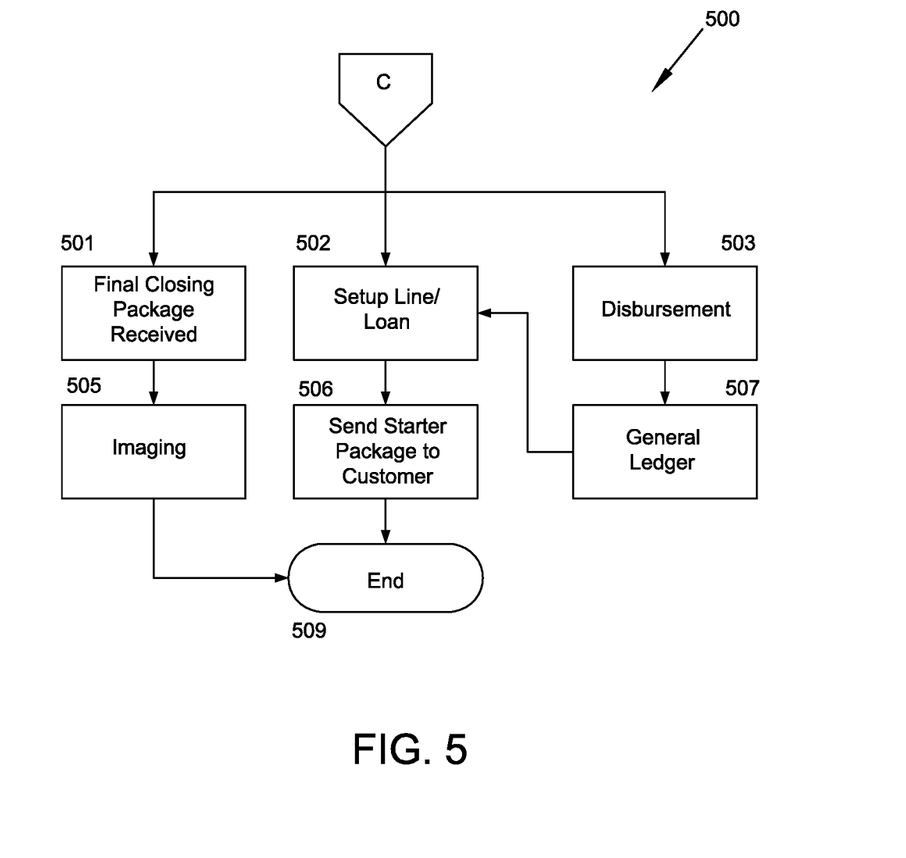
FIG. 5 is a flow chart representing additional closing processes according to an embodiment of the disclosed subject matter.

Referring now to FIG. 5, the final closing package may be received as shown in Block 501. The final closing package may include documents in electronic form or in hardcopy. These documents are imaged in Block 505. In Block 502, the lending product may be established, account number assigned etc. and a starter package including installment schedule, deposit slips, checks for credit lines, account numbers is sent to the customer, as shown in Block 506. Disbursements to the benefit of the customer are made by the financial institution as shown in Block 503 and entered into the general ledger in Block 507. The loan application and closing process is then completed as shown in Block 509. Completion of these steps and processes may also be communicated to the customer in an email, SMS, text message, tweet, posting, letter, phone call or other type to indicate completion.

Figure 6:
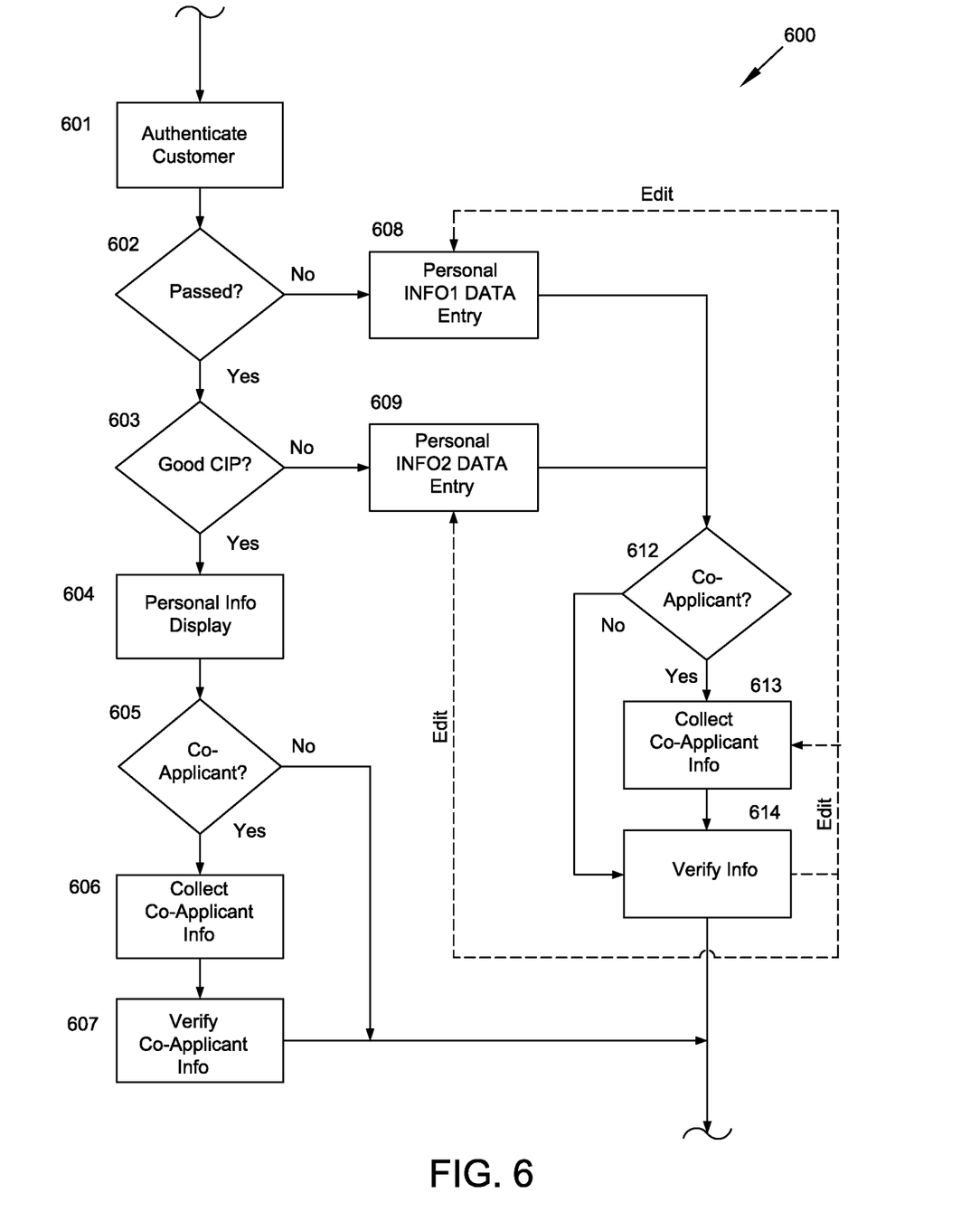
FIG. 6 is a flow chart representing authentication of the customer according to an embodiment of the disclosed subject matter.

In FIG. 6, a method for authenticating a customer who was determined to be an on-line customer in decision Block 105 of FIG. 1 is shown. The customer may be authenticated as shown in Block 601, the authentication may advantageously include the collection of customer identification information, as discussed previously. If the customer successfully passes the authentication as shown in decision Block 602, a predetermined client identification profile (CIP) for the customer is evaluated as shown in Block 603. The predetermined client identification profile is determined internally from internal and external information such as information from LexisNexis™ products. If the evaluation is acceptable the customer's personal information is displayed on the customer's viewing device as shown in Block 604 and attention is then turned to that of a co-applicant if one is determined, as shown in decision Block 605. Information is collected on the co-applicant in Block 606 and that information is verified as shown in Block 607. Absent a co-applicant, the customer may continue with the application for the selected products at Block 112 in FIG. 1. Generally, the co-applicant is subjected to similar checks as the customer.

If, however, the customer does not pass the customer authentication in decision Block 602, then an additional set of information (INFO1) is requested and entered by the customer. Additional information (INFO2) is also requested in Block 609 if the CIP is found not acceptable in decision Block 603, further processing is described with respect to the CIP outcome in FIG. 7 later. The additional information requested may be identical in both cases. Upon receipt of the additional information, INFO1 or INFO2, a determination of whether there is a co-applicant is made in decision Block 612. If there is a co-applicant, their information is collected and verified in Blocks 613 and 614 respectively, otherwise the application process continues as discussed previously. FIG. 6 also shows that the additional information and co-applicant's information may be edited by the customer any time prior to submission of the application.

Figure 7:
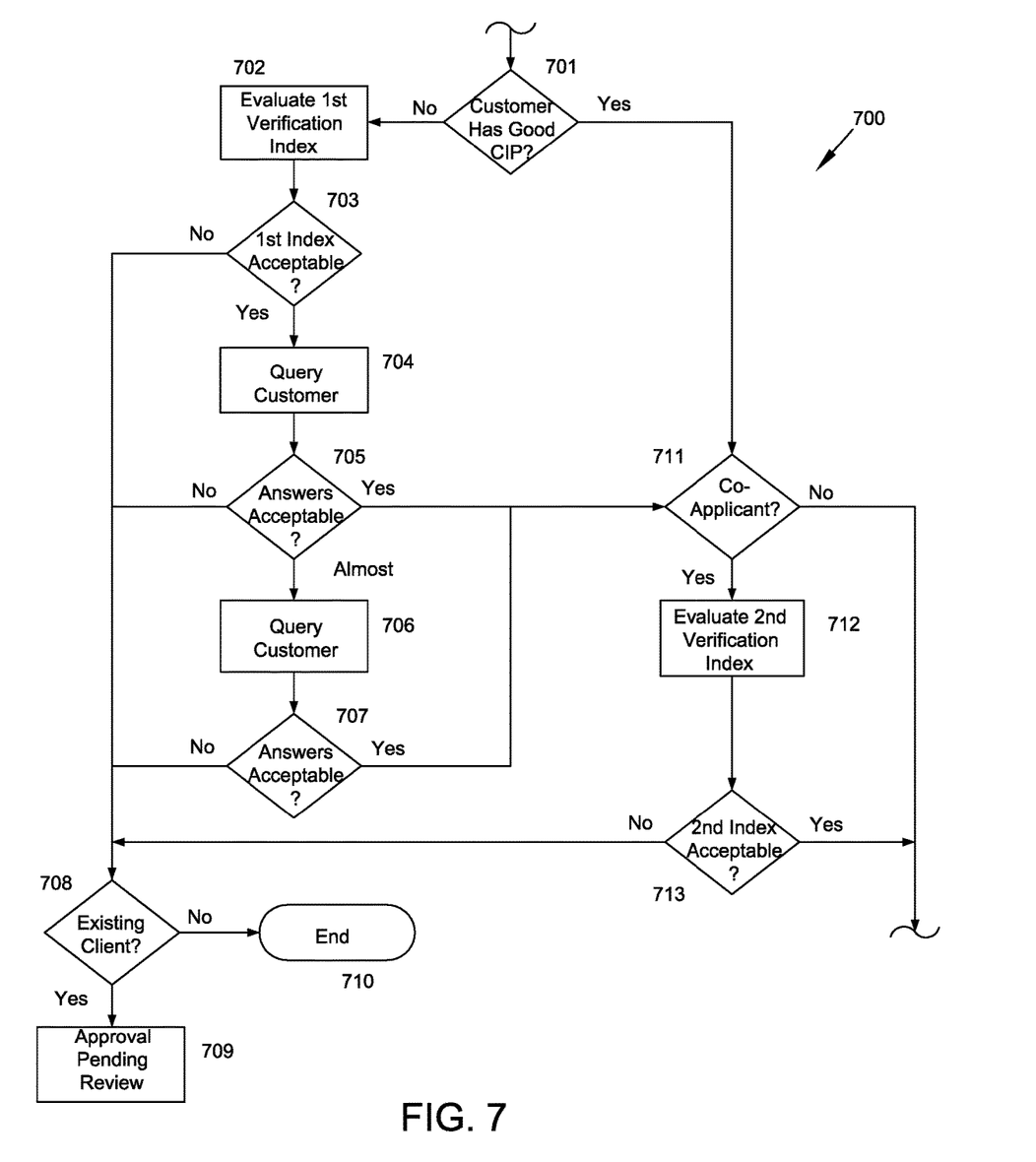
FIG. 7 is a flow chart representing a verification process based on the evaluation outcome of a customer's CIP according to an embodiment of the disclosed subject matter.

Turning to FIG. 7, an alternative method 700 to method 600 in FIG. 6 is shown. If the customer is not determined to be an on-line client, the customer must be identified as shown in Block 108. The method begins following the determination of whether the customer has a good CIP as shown in decision Block 701. If the customer has a good CIP, attention is turned to whether there is a co-applicant. If there is no co-applicant indicated in decision Block 711, then an application may be submitted. The process for a co-applicant will be discussed shortly. A determination that the customer does not have a good CIP in Block 701 results in an evaluation of a first verification index as shown in Block 702. If the first index is found acceptable in decision Block 703, then the customer is queried with one or a series of questions as shown in Block 704. The customer's answers are then verified and a determination of whether they are, or almost are acceptable is made in decision Block 705. If they are acceptable a determination of whether there is a co-applicant is undertaken in Block 711. If the answers are not acceptable then a determination on whether the customer is an existing client is undertaken as shown in Block 708. A third outcome may stem from decision Block 705, the answers may almost be acceptable. In the case of almost acceptable answers, the customer is queried a second time as shown in Block 706 and a yes or no determination of whether these second set of answers are acceptable. If they are not, a determination of whether the customer is an existing client is undertaken in Block 708. If the second set of answers is acceptable, a determination of whether there is a co-applicant is undertaken in Block 711. Continuing with Block 711, if there is no co-applicant then an application may be submitted following a presentation of the terms and condition. If there is a co-applicant in Block 711, then a second verification index is evaluated as shown in Block 712. If the second verification index is found acceptable in decision Block 713 then an application processed may continue in Block 112 of FIG. 1. Otherwise a determination of whether the customer is an existing client is made in decision Block 708. A negative decision reached in Block 708 indicating the customer is not an existing client may lead to a termination of the on-line process as shown in Block 710, whereas a positive decision from Block 708 may lead to a pending status, where approval is subject to a review process as shown in Block 709. This additional review process may advantageously include review of the past and current relationship between the financial institution and the customer, as well as other considerations related to the customer's client status.

For example, if the name, address, phone number and SSN match, a score reflecting a high matching comparison is given, whereas when one or more of these do not match, a score reflecting a lower matching comparison is applied. The customer is queried regarding answers related to his/her identity for verification. Questions in the query may include for example information typically known only to the individual, such as mother's maiden name, previous address, banking accounts etc.

Each verification index may represent evaluations using a particular set or area of information. The sets or areas of information may or may not be mutually exclusive. One verification index may be based on information which includes searches drawn from public records and directories. Another verification index may be based on the applicant information, for example, name, address, Social Security Number (SSN) and contact information. Yet another verification index may be based on past relationships between the customer and financial institutions. These verification indices may be performed internal by the financial institution or by a third party. The verification indexes may be compared to a predetermined threshold to determine if it is acceptable.

Embodiments of the disclosed subject matter may utilize drop down menus to show the options available to the customer and simplify their selection. Auto fill options may also be utilized for the convenience of the customer. The website format may also be selectable for use in mobile equipment such as Blackberries and PDA equipment, where screen space and functionality may be more limited than on a personal computer. Communications between the customer and the financial institution during the opening of an account may advantageously be encrypted.

The methods of on-line lending may be implemented using various software, hardware and protocols. Additionally information collected via the on-line lending process may be stored in a database for access at a future time. Time outs may also be utilized in the method to require selections and information to be input by the customer be contemporaneous with the requests.

The on-line lending advantageously utilizes real time evaluation of the risks due to fraud and identity by using information previously collected by the institution as well as information obtained from third parties. The decrease in processing times from days to minutes increases the convenience of account opening significantly.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

The invention claimed is:

1. A method of interfacing with a financial institution using a computer interface, the method comprising the steps of:
   (a) receiving an interface request from a customer after the customer has reached, via one of a plurality of paths through a computer network, a predetermined first webpage for the financial institution;
   (b) determining a first path upon which the customer reached the first webpage, wherein the first path includes a first website external to the financial institution;
   (c) determining, based on the determined first path, a first list of products and/or services offered by the financial institution;
   (d) presenting on the first webpage the determined first list of products and/or services offered by the financial institution, wherein the determined first list for the first path is different than a determined second list for a second path of the plural paths, wherein the second path includes a second website external to the financial institution different than the first website;
   (e) receiving a first input from the customer wherein the first input comprises an indication of a choice of at least one of the products and/or services in the determined first list offered by the financial institution;
   (f) authenticating the customer using a predetermined client identification profile for the condition where the customer is an existing online client of the financial institution, otherwise identifying the customer using either the predetermined client identification profile for the condition where the customer is an existing off-line client of the financial institution or challenge questions for the condition where the customer is not an existing off-line client of the financial institution;
   (g) after the customer is authenticated or identified in step (f), receiving from the customer a first set of information, wherein the first set of information is login information and includes at least one of: an online client user identification and password for the customer; the customer's last name; and the last four digits of the customer's social security number;
(h) receiving from the customer a second set of information, wherein the second set of information includes at least one of mortgage information, borrowing information, collateral information, employment information, income information, financial information, asset information, liability information, and combinations thereof;
(i) presenting to the customer a set of terms and conditions and receiving from the customer an authorization for the financial institution to perform a credit check on the customer and an application for review;
(j) performing a risk analysis on the customer;
(k) approving the application based at least in part on the risk analysis;
(l) receiving from the customer a third set of information; and
(m) providing to the customer a fourth set of information.

2. The method of claim 1 wherein the first input is a choice of one or more products wherein the products include a home equity line of credit, a home equity loan, an automobile loan, a line of credit, and an unsecured line of credit.

3. The method of claim 1 wherein the third set of information includes at least one of homeowner's insurance information, automobile insurance information, flood insurance information, hazard insurance information, and combinations thereof.

4. The method of claim 1 wherein the fourth set of information includes Real Estate Settlement Procedures Act information, good faith estimate of settlement costs information, loan amortization schedule information, client identification profile information, servicing information, home equity line of credit information, home equity loan information, and
   OK TO ENTER: /T.F.C/combinations thereof.

5. A method of interfacing with a financial institution using a computer interface, the method comprising the steps of:
   (a) determining a first list of products and/or services offered by the financial institution based on a first path through a computer network along which a customer reached a predetermined first webpage for the financial institution, wherein the first path includes a first website external to the financial institution;
   (b) receiving from a customer a selection from the determined first list, wherein the determined first list is associated with the first path and wherein the determined first list is different than a determined second list associated with a second path through the computer network, wherein the second path includes a second website external to the financial institution different than the first website;
   (c) receiving from the customer a first set of information, wherein the first set of information is login information and includes at least one of: an online client user identification and password for the customer; the customer's last name; and the last four digits of the customer's social security number;
   (d) determining an identity of the customer based on the received first set of information and ending the process for the condition where the customer cannot be identified from the first set of information;
   (e) verifying the first set of information;
   (f) authenticating the customer using a predetermined client identification profile for the condition where the customer is an existing online client of the financial institution and pre-populating an application for the selected product and/or service with at least some of the information from the first set of information, otherwise identifying the customer using either the predetermined client identification profile for the condition where the customer is an existing off-line client of the financial institution or challenge questions for the condition where the customer is not an existing off-line client of the financial institution;
   (g) after the customer is authenticated or identified in step (f), receiving from the customer a second set of information wherein the second set of information includes at least one of customer information, information regarding a purpose for the product, collateral information, customer income information, customer asset information, customer liability information, and combinations thereof;
   (h) determining an amount of a line of credit or an amount and term of a loan for the selected product;
   (i) receiving disclosure information from the customer; and
   (j) receiving the application from the customer.

6. The method of claim 5 further comprising the steps of:
   (k) receiving authorization from the customer for the financial institution to have a credit check performed on the customer;
   (l) determining at least one of a net worth for the customer and a debt to income ratio for the customer;
   (m) determining if the financial institution has approval to proceed with processing the application:
      (i) if the financial institution does not have approval to proceed, then declining the application and ending the process;
      (ii) if the financial institution determines that there are outstanding issues to review with the customer:
         (A) notifying the customer of the issues and if the issues are resolved, then determining pricing information for the product;
         (B) notifying the customer of the issues and if the issues are not resolved, then ending the process;
      (iii) if the financial institution determines that it has approval to proceed with processing the application, then determining pricing information for the product;
   (n) determining loan terms for the product;
   (o) presenting the loan terms to the customer;
   (p) providing cross-selling information to the customer; and
   (q) receiving from the customer a decision on the loan terms:
      (i) ending the process if the customer rejects the loan terms;
      (ii) if the customer accepts the loan terms receiving certification information from the customer.

7. The method of claim 6 further comprising the steps of:
   (r) determining a type of closing procedure and if an online closing procedure is requested by the customer, presenting a summary of the application to the customer;
   (s) performing application processing by the financial institution;
   (t) if there are changes to be made to the application, notifying the customer of the required changes and receiving the customer's response, otherwise notifying the customer that the product is ready for closing;
(u) receiving account options from the customer;
(v) receiving customer disbursement information;
(w) establishing closing terms for the product;
(x) presenting to the customer the closing terms for the product; and
(y) receiving from the customer a decision on the closing terms:
  (i) processing a closing term issue if the customer does not accept the closing terms and ending the process if the closing term issue is not resolved; or
  (ii) re-establishing closing terms for the home equity line of credit or the home equity loan for the customer if the closing term issue is resolved;
  (iii) sending closing documents to the customer if the customer accepts the closing terms.

8. The method of claim 7 wherein the application processing by the financial institution includes a pre-closing process, a final underwriting process, and a documentation preparation process.

9. The method of claim 7 wherein the closing documents are sent to the customer either electronically or non-electronically.

10. The method of claim 7 further comprising the steps of:
(z) receiving final closing information from the customer and imaging the final closing information;
(aa) making a disbursement for the benefit of the customer and entering the disbursement in a ledger for the financial institution; and
(ab) setting up a product account for the customer and sending to the customer a starter package.

* * * * *

UNITED STATES PATENT AND TRADEMARK OFFICE
CERTIFICATE OF CORRECTION

PATENT NO. : 10,657,590 B2
APPLICATION NO. : 14/993963
DATED : May 19, 2020
INVENTOR(S) : Teresa Rose et al.

Page 1 of 1

It is certified that error appears in the above-identified patent and that said Letters Patent is hereby corrected as shown below:

In the Claims

Column 11, Line 40 In Claim 4, please delete "OK TO ENTER: /T.F.C/".

Signed and Sealed this
Fourteenth Day of July, 2020

Andrei Iancu
*Director of the United States Patent and Trademark Office*